United States Patent Office 2,812,542
Patented Nov. 12, 1957

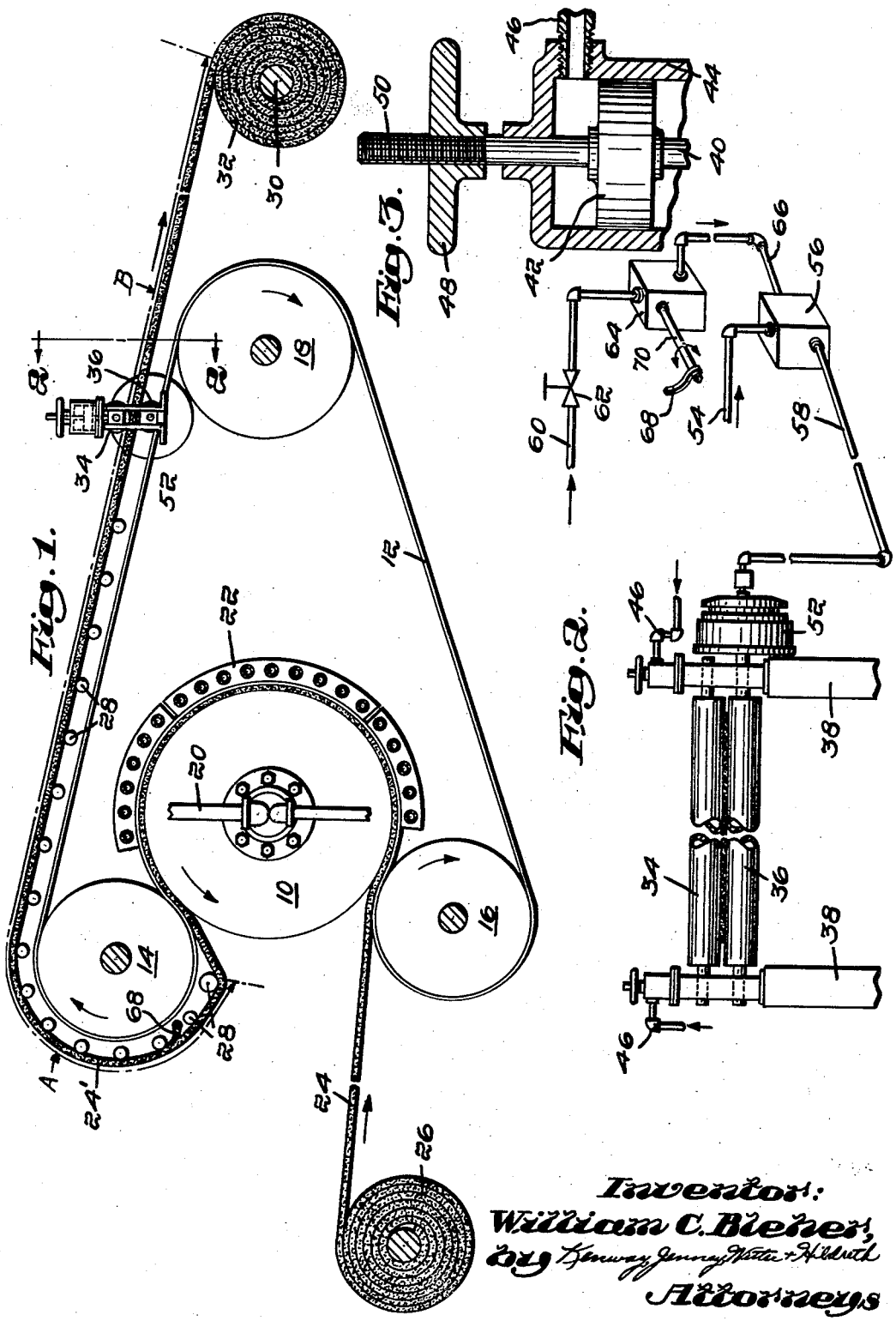

2,812,542

METHOD AND APPARATUS FOR RELIEVING VULCANIZED BELTING OF INTERNAL STRESSES

William C. Bleher, West Roxbury, Mass., assignor, by mesne assignments, to American Biltrite Rubber Co., Inc., a corporation of Delaware Application August 4, 1955, Serial No. 526,379

6 Claims. (Cl. 18—6)

This invention relates to the continuous vulcanization or curing of rubberized belting and the like and comprises more particularly a novel stress-relieving treatment of the belting directly following its passage through the vulcanizing field.

In the continuous vulcanization of rubberized belting, as heretofore conducted, the belting under relatively high tension is fed to and arcuately about a vulcanizing drum and subjected to pressure and heat between the drum and a cooperating steel band during its passage through the vulcanizing field, as illustrated and described in Reissue Patent No. 19,660. Upon leaving the drum and band the hot vulcanized belting is wound under wind-up tension into a roll. The belting as thus produced and held under tension in the roll during the period of cooling is unable to shrink and results in an internally stressed and low-stretch product. The primary object of my invention resides in a novel method and apparatus permitting the vulcanized belting to cool in slack condition between the vulcanizing and winding-up operations, thereby relieving the belting of internal stresses and producing a final product having an accurately controlled stress-strain modulus and higher available elongation, as well as being stronger and more resistant to elongation.

In accordance with the invention, the belting is passed from the vulcanizing field through a zone of substantial length to the wind-up station and is so gripped at an intermediate point in this zone that the belting is rendered substantially slack for a cooling period directly following its passage from the vulcanizing field and before it is wound into a roll. Thus the vulcanized belting is permitted freely to shrink and relieve internal stresses during the cooling period directly following its vulcanization and is packaged in roll form following such treatment. The production of a novel method and apparatus for performing this function and producing a superior product comprises a further object of the invention.

These and other features of the invention will be best understood and appreciated from the following description of a preferred embodiment thereof selected for purposes of illustration and shown in the accompanying drawings, in which, Fig. 1 is a diagrammatic view in side elevation illustrating the invention, Fig. 2 is a fragmentary view taken on line 2—2 of Fig. 1, and illustrating other cooperating parts, and Fig. 3 is an enlarged fragmentary sectional view of a detail.

The vulcanizing machine illustrated in the drawings comprises a vulcanizing drum 10 and a cooperating endless steel band 12 arranged in the manner illustrated and described in Bierer Patent No. 2,039,271. The steel band passes about an arcuate portion of the drum and from thence in a generally triangular path about top and bottom guide rolls 14 and 16, and a rear roll 18. The drum is adapted to be heated by passing steam thereinto through a pipe 20 and cooperating with the band at the said arcuate portion of the drum are steam heated jackets 22. The roll 18 is adjustable as described in said patent to place the band 12 under predetermined tension.

The drum 10 is rotated in the direction of the arrow and the belting 24 to be vulcanized is fed from a supply roll 26 to and about the drum beneath the band 12 as illustrated. In its passage from the roll 26 to the drum, the belting is placed under predetermined tension and stretched a predetermined amount, as illustrated and described in said Reissue Patent No. 19,660, so that the belting disposed in the vulcanizing field on the drum and beneath the band is subjected to longitudinal tension, pressure and heat and is thus vulcanized during its passage through the vulcanizing field.

In accordance with my invention the vulcanized belting is preferably stripped substantially simultaneously from the drum and band as it leaves the vulcanizing field and is conducted therefrom through a cooling path with both faces exposed to the atmosphere. During this passage the belting is held in substantially slack condition as and for the purpose hereinafter described.

Disposed about the band 12 on the roll 14 and along the top reach of the band is a series of idler rolls 28. The vulcanized belting 24' is disposed on and outwardly of these rolls to a belt winding reel at 30 where the belting is wound under predetermined tension into a coil 32. Heretofore the entire vulcanized belting back to its separation from the drum and band has been under this tension with the result that the belting has cooled without release of the tension and stresses placed on it during vulcanization. I have discovered that a superior product having a controlled and accurate stress-strain modulus is secured if the vulcanized belting is allowed to cool and shrink under slack and relaxed condition. The mechanism for effecting this result will now be described.

The wind-up reel at 30 is disposed remotely from the vulcanizing drum so that the vulcanized belting passes through a path of substantial length from the drum to the reel. At an intermediate point in this path I provide a pair of belt-gripping rolls 34 and 36 rotatably mounted in uprights 38. The bearings for the top roll 34 are each carried on a rod 40 extending downwardly from a piston 42 within a cylinder 44. Air under regulated pressure enters the cylinders at 46 above the pistons to force the top roll downwardly into belt-gripping relation with the bottom roll. It is desirable that the rolls shall not come into contact when no belting is present therebetween and to prevent such contact I provide a stop 48 threaded to a rod 50 extending upwardly from each piston. Thus the rolls 34 and 36 are adapted to grip the belting intermediately along the cooling path from the drum to the wind-up reel.

The function of the rolls 34 and 36 is to grip the vulcanized belting sufficiently to produce the desired wind-up tension at the reel and leave the remaining portion of the belting from the gripping rolls to the drum substantially slack and relieved of tension. I effect this object by applying a predetermined braking effort to the roll 36 to resist movement of the belting to the wind-up reel.

This mechanism, as illustrated in the drawing, comprises an air operated friction clutch at 52. Air under full pressure at 54 enters a pressure regulator at 56 and from thence is conducted under regulated pressure through a pipe 58 to the clutch. Air from a pipe 60 passes through a pressure reducing valve 62 to a regulator at 64 and from thence through a pipe 66 to the regulator 56. The regulator 64 is controlled by a feeler 68 on a shaft 70, the feeler being disposed to engage the inner face of the vulcanized belting outwardly of the roll 14 as illustrated in Fig. 1. The position of the feeler automatically controls the regulated pressure in the pipe 66 which in turn automatically controls the regulated pressure in the pipe 58 to the clutch. Thus a constant braking effort is maintained through the clutch to the roll 36 to place the vulcanized belting under the desired wind-up tension between the reel and gripping rolls and effect a predetermined slack in the belting between the rolls and drum. In this manner the belting is allowed to cool and shrink under normal slack condition as it passes through the cooling zone A from the vulcanizing drum and is thereafter held under desired wind-up tension as it passes through the zone B to the reel.

It will now be apparent that I have produced a novel method and apparatus for effecting the cooling and shrinking of the belting under normal slack condition as it leaves the vulcanizing field. During its passage through the zone A the belting cools, shrinks and is relieved of vulcanizing strains taking place in the vulcanizing field. When it reaches the gripping rolls the belting is cooled to a temperature where little stretching takes place in the wind-up zone B. Thus the final product will have reserved a large amount of its initial stretch capacity and be more satisfactory as a high stretch product.

Having thus disclosed my invention, what I claim as new and desire to secure by Letters Patent of the United States is:

1. In the continuous production of vulcanized belting wherein the belting is continuously moved longitudinally through a vulcanizing field and subjected to tension, pressure and heat therein and is continuously moved therefrom to a remote wind-up station and wound under tension into a roll, the method of relieving the belting of internal stresses directly following its vulcanization, which consists in gripping the belting intermediately between the vulcanizing field and the wind-up station with a regulated pressure and resistance to longitudinal movement providing predetermined wind-up tension in a zone of the belting disposed between the wind-up station and the belt gripping station and a predetermined slack in a cooling zone of the belting disposed between the belt gripping station and the vulcanizing field in which cooling zone the vulcanized belting cools and shrinks in slack and relaxed condition.

2. The method defined in claim 1 in which the two faces of the belting are in continuous surface engagement under pressure with two continuous and opposed vulcanizing surfaces in the vulcanizing field and in which the belting is stripped free of said surfaces as it leaves the vulcanizing field and remains free thereof during its passage through said zones.

3. A continuous vulcanizing machine comprising a vulcanizing drum, an endless pressure band, means supporting the band under tension with a portion thereof extending arcuately about and in pressure contact with an arcuate peripheral portion of the drum, means providing vulcanizing heat to the band and drum, the drum and band being adapted to receive belting therebetween and vulcanize the belting continuously upon rotation of the drum, a wind-up reel remote from the drum for receiving and winding the vulcanized belting into a roll, means for supporting and conducting the vulcanized belting through a zone of substantial length from the drum and band to the wind-up reel, a pair of rolls intermediately between the drum and reel for gripping the belting therebetween and dividing said zone into a slack belt cooling portion between the drum and rolls and a tensioned belt wind-up portion between the rolls and reel, and means for applying a predetermined braking effort to one of the rolls to resist movement of the belting to the wind-up reel, said braking means being adapted to place the belting under tension in the wind-up portion between the rolls and reel and effect a predetermined slack in the belting in the cooling portion between the rolls and drum.

4. The vulcanizing machine defined in claim 3 in which said means for applying the braking effort includes a controlling feeler disposed to engage the belting between the rolls and drum, and mechanism cooperating with the feeler to maintain a predetermined slack in the belting between the rolls and drum.

5. The vulcanizing machine defined in claim 4 in which said cooperating mechanism includes an air pressure braking clutch to said one roll and an air valve controlled by said feeler.

6. The vulcanizing machine defined in claim 3 plus means for resiliently moving one of the rolls toward and holding it in belt gripping relation with the other roll, and means limiting said movement to a position preventing direct pressure contact of the rolls.

References Cited in the file of this patent

UNITED STATES PATENTS

| | | |
|---|---|---|
| 2,181,859 | Baker et al. | Dec. 5, 1939 |
| 2,373,215 | Young | Apr. 10, 1945 |
| 2,745,134 | Collins | May 15, 1956 |